United States Patent Office.

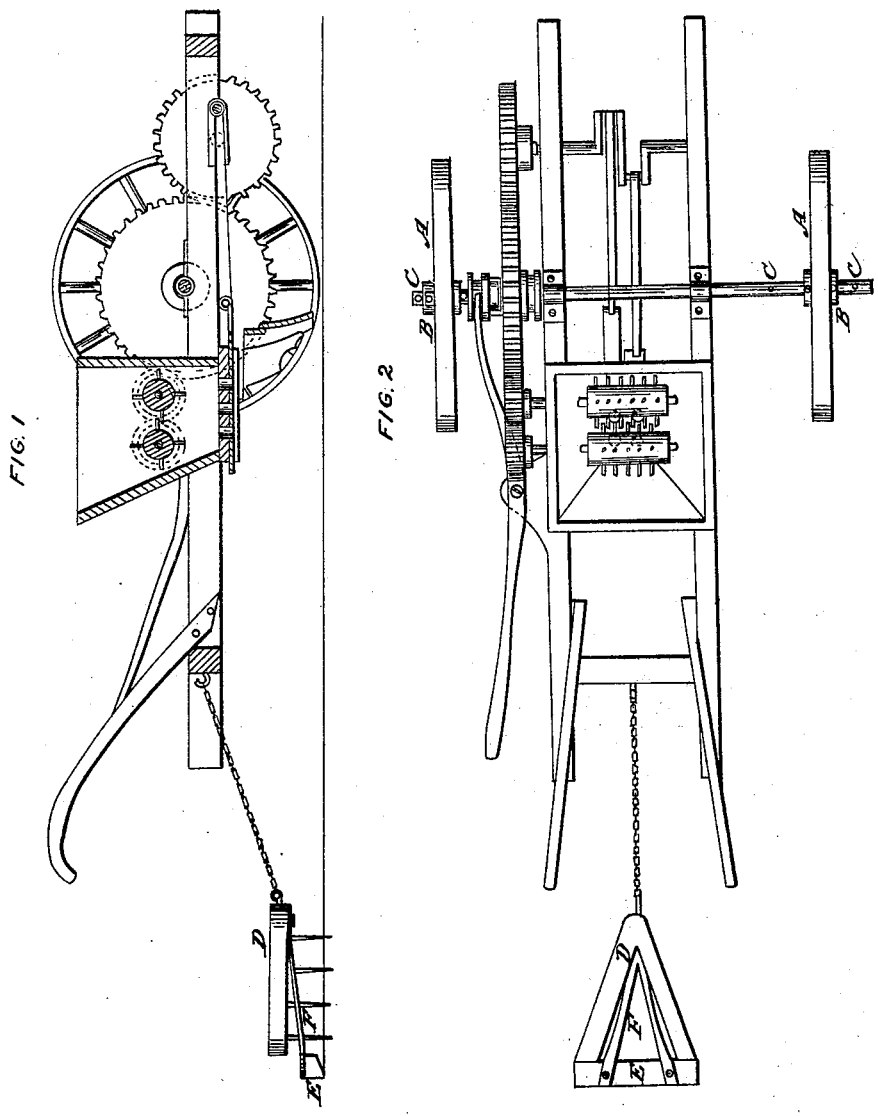

E. L. SYKES, OF OKOLONA, MISSISSIPPI.

Letters Patent No. 99,031, dated January 18, 1870.

IMPROVEMENT IN COTTON-PLANTER.

The Schedule referred to in these Letters Patent and making part of the same

To all whom it may concern:

Be it known that I, E. L. Sykes, of Okolona, in the county of Chickasaw, and State of Mississippi, have invented a new and improved Cotton-Planter; and I do hereby declare that the following is a full, clear, and exact description thereof, which will enable others skilled in the art to make and use the same, reference being had to the accompanying drawings, forming part of this specification.

This invention relates to improvements in cotton-planters, and consists in an improved covering and clod-scraping attachment, the latter being arranged to move the clods away from the drills in advance of the coverer.

Figure 1 represents a longitudinal sectional elevation of my improved planter, and Figure 2 is a plan view of the same.

Similar letters of reference indicate corresponding parts.

Instead of permanently connecting the wheels to the axle, so that one machine will only answer for planting the rows at a fixed distance apart, I propose to connect them to the axle, so that they may be moved to or from each other, which may be done in any preferred way.

In this example, I have represented the wheels A as provided with set-screws B, and the axles as having sockets C, at suitable distances apart, near the ends, for the reception of the set-screws.

It is necessary that the wheels A run centrally between the rows, for the reason that previous to planting, the ground is ridged, and as the seed is to be planted on the top of the ridges, if the wheels do not run in the bottoms of the grooves between the ridges, the drill will be carried above the top of the ridge, and fail to accomplish its work.

The distances apart at which the rows are planted vary materially in different sections of the country, and hence it is important that the planting-machines be made adjustable in this respect.

The clod-scraping attachment consists of a toothed Λ-shaped harrow, D, attached to the rear of the frame of the machine, by a chain or other means, so as to be drawn along the row, with one leg on one side, and the other on the other side, whereby the clods will be thrown off on each side, leaving a smooth surface of fresh earth for the coverer E to act upon.

This coverer consists of a block, with a bevelled lower face, and arranged to be drawn along over the surface of the ridge, whereon the drill is formed, and the seed dropped, so that the bevelled face will ride over the surface, and press it down. I attach this coverer to the harrow by springs F, which support it in rear of the legs of the harrow, so as to yield to the inequalities of the ground, and to follow and finish the work.

Having thus described my invention,

I claim as new, and desire to secure by Letters Patent—

The combination of a spring-coverer, E F, with clod-movers arranged in front thereof, to throw the clods to either side, and leave the fine dirt only for covering the seed, all as shown and described.

The above specification of my invention signed by me, this 24th day of July, 1869.

E. L. SYKES.

Witnesses:
    W. E. Berry,
    J. A. Loughridge,
    James D. Carlisle,
    Thos. Evans.